(12) United States Patent
Shimizu

(10) Patent No.: US 12,521,882 B2
(45) Date of Patent: Jan. 13, 2026

(54) HEIGHT ADJUSTMENT DEVICE AND PRODUCTION APPARATUS

(71) Applicant: KAWASAKI JUKOGYO KABUSHIKI KAISHA, Kobe (JP)

(72) Inventor: Ippei Shimizu, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 195 days.

(21) Appl. No.: 18/559,079

(22) PCT Filed: Jun. 6, 2022

(86) PCT No.: PCT/JP2022/022829
§ 371 (c)(1),
(2) Date: Nov. 6, 2023

(87) PCT Pub. No.: WO2022/264859
PCT Pub. Date: Dec. 22, 2022

(65) Prior Publication Data
US 2024/0238972 A1    Jul. 18, 2024

(30) Foreign Application Priority Data

Jun. 14, 2021   (JP) .................................. 2021-098655

(51) Int. Cl.
*B25J 9/16*    (2006.01)
*B25J 15/08*   (2006.01)

(52) U.S. Cl.
CPC ............. *B25J 9/1664* (2013.01); *B25J 15/08* (2013.01)

(58) Field of Classification Search
CPC ...... B25J 9/1664; B25J 15/08; B25J 17/0208; B25J 17/0225; B25J 17/0241; B25J 17/0258–0275
See application file for complete search history.

(56) References Cited

U.S. PATENT DOCUMENTS

| 11,434,087 | B2 * | 9/2022 | Kodama ........... H01L 21/67742 |
| 12,440,971 | B2 * | 10/2025 | Shindo ................. B25J 17/0275 |
| 2008/0124206 | A1 | 5/2008 | Choi et al. |
| 2024/0278437 | A1 * | 8/2024 | Song ..................... B25J 13/089 |

FOREIGN PATENT DOCUMENTS

| CN | 201350628 Y | | 11/2009 | |
| JP | H1064786 A | * | 3/1998 | ......... G03F 7/70691 |
| JP | 2008-141158 A | | 6/2008 | |
| JP | 2020189390 A | * | 11/2020 | |
| KR | 10-2006-0118894 A | | 11/2006 | |

* cited by examiner

*Primary Examiner* — Gerald McClain
(74) *Attorney, Agent, or Firm* — Oliff PLC

(57) ABSTRACT

A height adjustment device includes a lower part, an upper part, and a height adjustment unit including a first spherical plain bearing, a second spherical plain bearing, a third spherical plain bearing, a first lifter, a second lifter, and a third lifter. The height adjustment device is configured to adjust a height of the upper part with respect to the lower part by driving the first lifter, the second lifter, and the third lifter.

4 Claims, 9 Drawing Sheets

HEIGHT DIRECTION

HEIGHT DIRECTION

WIDTH
DIRECTION

LENGTH
DIRECTION

HEIGHT DIRECTION
WIDTH DIRECTION (A)

(B)

HEIGHT ADJUSTMENT DEVICE AND PRODUCTION APPARATUS

TECHNICAL FIELD

The present disclosure relates to a height adjustment device and a production apparatus, in particular to a height adjustment device and a production apparatus for adjusting a height of an apparatus main body.

BACKGROUND ART

Production apparatuses such as semiconductor production apparatuses are known in the art. Such a production apparatus is disclosed in Japanese Patent Laid-Open Publication No. JP 2008-141158, for example.

The above Japanese Patent Laid-Open Publication No. JP 2008-141158 discloses a semiconductor production apparatus including a wafer transfer device. The wafer transfer device includes a wafer support member for supporting a wafer. A cassette accommodating a number of wafers, and inspection devices for wafer inspection are arranged in proximity to the wafer transfer device. After pulling out a wafer from the cassette, the wafer transfer device rotates toward the inspection device and then places the wafer into the inspection device. In the inspection device, the wafer is inspected.

PRIOR ART

Patent Document

Patent Document 1: Japanese Patent Laid-Open Publication No. JP 2008-141158

SUMMARY OF THE INVENTION

Although not stated in the above Japanese Patent Laid-Open Publication No. JP 2008-141158, a height of the wafer support member is deviated from a desired height in some cases, for example, in the semiconductor production apparatus disclosed in the above Japanese Patent Laid-Open Publication No. JP 2008-141158. In such a case, it is difficult to adjust the height of the wafer support member by adjusting, with respect to a lower part that is a part of an apparatus main body, a height of an upper part that is other part of the apparatus main body. This problem will arise in other apparatuses other than the semiconductor production apparatus.

The present disclosure is intended to solve the above problem, and one object of the present disclosure is to provide a height adjustment device and a production apparatus capable of adjusting, with respect to a lower part that is a part of an apparatus main body, a height of an upper part that is other part of the apparatus main body.

In order to attain the aforementioned object, a height adjustment device according to a first aspect of the present disclosure is a height adjustment device installed in a predetermined apparatus main body including a lower part that is a part of the predetermined apparatus main body; an upper part that is one other part of the predetermined apparatus main body, and faces the lower part in a height direction; and a height adjustment unit including a first spherical plain bearing, a second spherical plain bearing and a third spherical plain bearing that are interposed between the lower part and the upper part, and are arranged at different points from each other as viewed in the height direction, and a first lifter, a second lifter and a third lifter that are arranged corresponding to the first spherical plain bearing, the second spherical plain bearing and the third spherical plain bearing respectively, and are configured to adjust a height of the upper part with respect to the lower part, wherein the height of the upper part is adjusted with respect to the lower part by driving the first lifter, the second lifter and the third lifter.

In the height adjustment device according to a first aspect of the present disclosure, as discussed above, a height adjustment unit including a first spherical plain bearing, a second spherical plain bearing and a third spherical plain bearing and a first lifter, a second lifter and a third lifter that are arranged corresponding to the first spherical plain bearing, the second spherical plain bearing and the third spherical plain bearing, respectively, are provided so that the height of the upper part is adjusted with respect to the lower part by driving the first lifter, the second lifter and the third lifter. Accordingly, the height of the upper part with respect to the lower part can be adjusted by using the first, second and third spherical plain bearings without distortion of the lower part and the upper part relative to each other. As a result, it is possible to easily adjust, with respect to the lower part, which is a part of the predetermined apparatus main body, the height of the upper, which is other part of the predetermined apparatus main body. Also, an inclination of the upper part with respect to the lower part can be adjusted by using the first, second and third spherical plain bearings without distortion of the lower part and the upper part relative to each other. Consequently, it is possible to easily adjust the inclination of the upper with respect to the lower part.

In order to attain the aforementioned object, a production apparatus according to a second aspect of the present disclosure includes a production apparatus main body; a height adjustment device installed in the production production apparatus main body, wherein the height adjustment device includes a lower part that is a part of the production apparatus main body, an upper part that is one other part of the production apparatus main body, and faces the lower part in a height direction, and a first spherical plain bearing, a second spherical plain bearing and a third spherical plain bearing that are interposed between the lower part and the upper part, and are arranged at different points from each other as viewed in the height direction, and a first lifter, a second lifter and a third lifter that are arranged corresponding to the first spherical plain bearing, the second spherical plain bearing and the third spherical plain bearing respectively, and are configured to adjust a height of the upper part with respect to the lower part, and wherein the height adjustment device is configured to adjust the height of the upper part with respect to the lower part by driving the first lifter, the second lifter and the third lifter.

In the production apparatus according to the second aspect of the present disclosure, as discussed above, a height adjustment device including a first spherical plain bearing, a second spherical plain bearing and a third spherical plain bearing and a first lifter, a second lifter and a third lifter that are arranged corresponding to the first spherical plain bearing, the second spherical plain bearing and the third spherical plain bearing, respectively, are provided so that the height of the upper part is adjusted with respect to the lower part by driving the first lifter, the second lifter and the third lifter. Accordingly, the height of the upper part with respect to the lower part can be adjusted by using the first, second and third spherical plain bearings without distortion of the lower part and the upper part relative to each other. As a result, it is possible to easily adjust, with respect to the lower part, which is a part of the production apparatus main body, the height of the upper part, which is other part of the production apparatus main body. Also, an inclination of the upper part with respect to the lower part can be adjusted by using the first, second and third spherical plain bearings without distortion of the lower part and the upper part relative to each other. Consequently, it is possible to easily adjust the inclination of the upper with respect to the lower part.

According to the present disclosure, as discussed above, it is possible to easily adjust, with respect to a lower part that is a part of a production apparatus main body, a height and an inclination of the upper part that is one other part of the production apparatus main body.

BRIEF DESCRIPTION OF THE DRAWINGS

FIG. 7 is a cross-sectional view showing the spherical plain bearing and its peripheral part of the height adjustment device according to the one embodiment taken along a plane along a height direction, wherein

FIG. 8 is a cross-sectional view showing the spherical plain bearings and their peripheral parts of the height adjustment device according to the one embodiment taken along a plane along a height direction, wherein

FIG. 10 is a cross-sectional view showing the blades according to the one embodiment as viewed from its distal part, wherein FIG. 10(A) is a cross-sectional view showing the blades before an inclination of the blades are adjusted, and FIG. 10(B) is a cross-sectional view showing the blades after the inclination of the blades is adjusted.

FIG. 11 is a cross-sectional view showing the blades according to the one embodiment as viewed from its distal part, wherein

MODES FOR CARRYING OUT THE INVENTION

Embodiments embodying the present disclosure will be described with reference to the drawings.

A production apparatus 100 according to one embodiment is now described with reference to FIGS. 1 to 11.
(Configuration of Production Apparatus)

Figure 1:
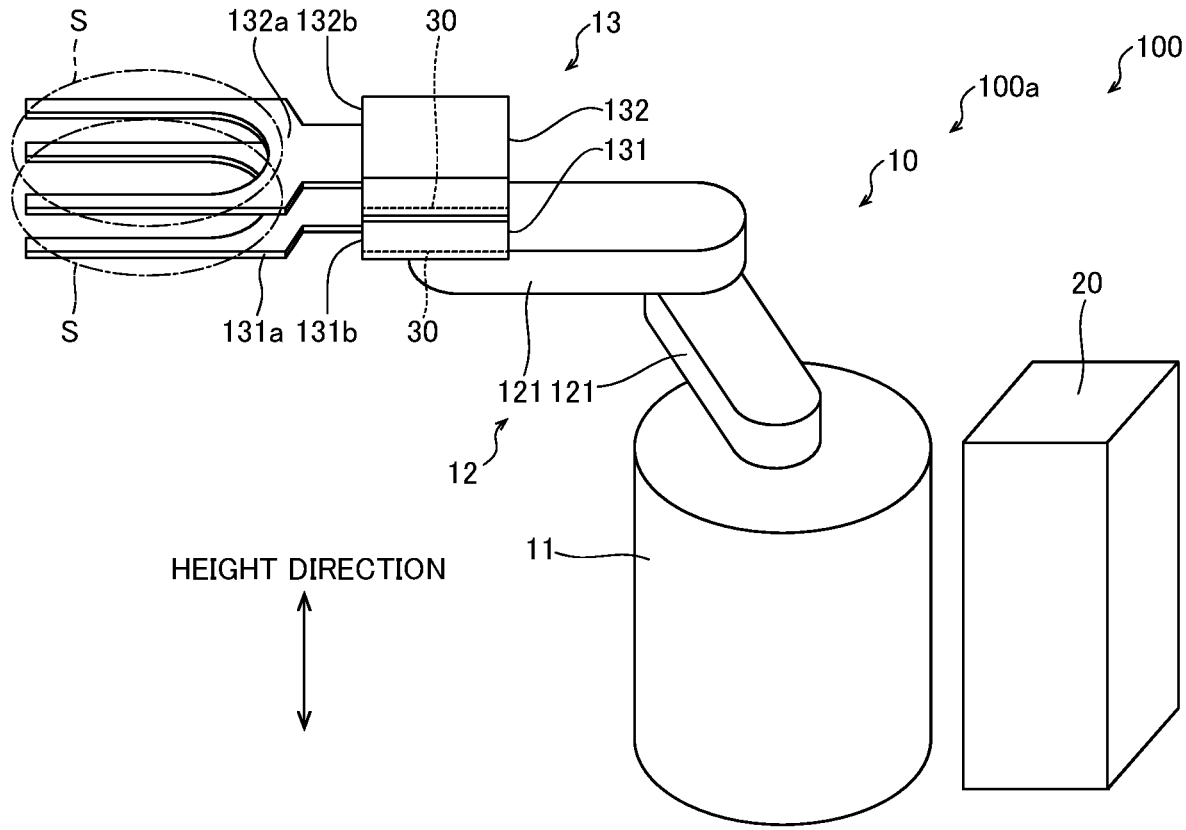
FIG. 1 is a perspective view entirely showing a configuration of a production apparatus according to one embodiment.

The production apparatus 100 according to the one embodiment is an apparatus for producing semiconductors, as shown in FIG. 1. Specifically, the production apparatus 100 includes a robot 10 configured to hold and convey semiconductors substrates S as wafers, and a controller 20 configured to control operation of the robot 10. The robot 10 serves as a production apparatus main body 100a. The robot 10 includes a base 11 extending in a height direction, an arm part 12 mounted to the base 11, and a hand part 13 mounted to a distal end of the arm part 12. The production apparatus main body 100a is an example of a predetermined apparatus main body.

The arm part 12 part is configured to move the hand part 13. The arm part 12 part is a horizontal multi-joint robot. The arm part 12 part has a proximal end connected to the base 11. The arm part 12 includes a plurality of link parts (two link parts) 121. One Link 121 can be rotated about an end of another link 121 as its rotation center. The link parts 121 are connected to each other by a joint including a servomotor.

The hand part 13 is configured to hold the semiconductor substrates S. The hand part 13 includes has a lower hand 131 and an upper hand 132. The lower hand 131 and the upper hand 132 are aligned in the height direction. The lower hand 131 has a plate-shaped blade 131a configured to hold the semiconductor substrate S, and a holding member 131b configured to hold a proximal end of the blade 131a. The upper hand 132 has a plate-shaped blade 132a configured to hold the semiconductor substrate S, and a holding member 132b configured to hold a proximal end of the blade 132a. The blades 131a and 131b have a bifurcated distal end. The blade 131a and the blade 132a are arranged adjacent to each other in the height direction. The blade 131a is an example of a first mechanism, and an example of a first blade. The blade 132a is an example of a second mechanism, and an example of a second blade.

The controller 20 includes a control circuit including a processor configured to control movement of the robot 10, and a memory configured to store programs for controlling the movement of the robot 10.

In this embodiment, the production apparatus 100 further includes height adjustment devices 30 installed in the production apparatus main body 100a. The height adjustment devices 30 are installed in the robot 10, which serves as the production apparatus main body 100a. The height adjustment device 30 are arranged between the arm part 12 and the hand part 13 of the robot 10. Each of the blade 131a of the lower hand 131 and the blade 132a of the upper hand 132 is provided with the height adjustment device 30. Each of the holding member 131b of the lower hand 131 and the holding member 132b of the upper hand 132 is provided with the height adjustment device 30. The height adjustment device 30 is an example of a height adjustment unit.

(Configuration of Height Adjustment Device)

Figure 2:
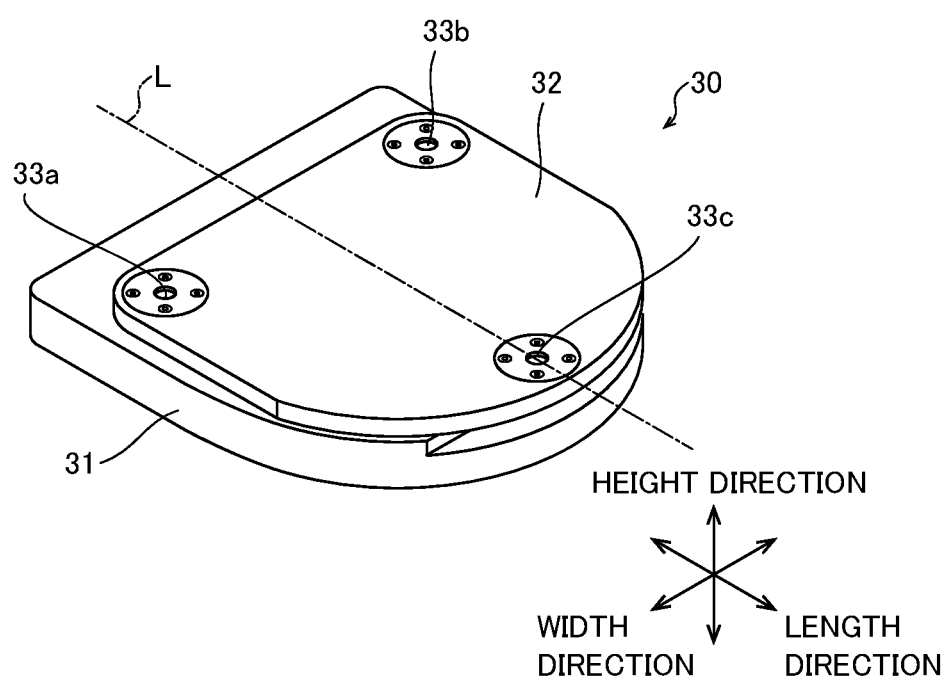
FIG. 2 is a perspective view showing a height adjustment device according to the one embodiment.

As shown in FIG. 2, the height adjustment device 30 includes the plate-shaped lower part 31, which is arranged an arm part 12 side, and the plate-shaped upper part 32, which is arranged on a hand part 13 side and faces the lower part 31 in the height direction. The lower part 31 is a part of the production apparatus main body 100a. The upper part 32 is one other part of the production apparatus main body 100a. The height adjustment device 30 is configured to adjust, with respect to the lower part 31, which is a part of the production apparatus main body 100a, a height and an inclination of the upper part 32, which is one other part of the production apparatus main body 100a.

The height adjustment device 30 further includes three spherical plain bearings 33a, 33b and 33c that are interposed between the lower part 31 and the upper part 32, and are arranged at different points from each other as viewed in the height direction. The spherical plain bearing 33a, 33b and 33c are examples of first, second and third spherical plain bearings, respectively.

The spherical plain bearing 33c is positioned on a distal part on a center axis L that passes through a center in a width direction of the height adjustment device 30 and extends from a proximal part to the distal part of the robot 10. The spherical plain bearings 33a and 33b are positioned on the proximal part of the robot 10 with respect to the spherical plain bearing 33c. The spherical plain bearings 33a and 33b are arranged symmetrically with respect to the central axis L as a symmetry axis as viewed in the height direction. The spherical plain bearings 33a, 33b and 33c are arranged at the same height.

Figure 3:
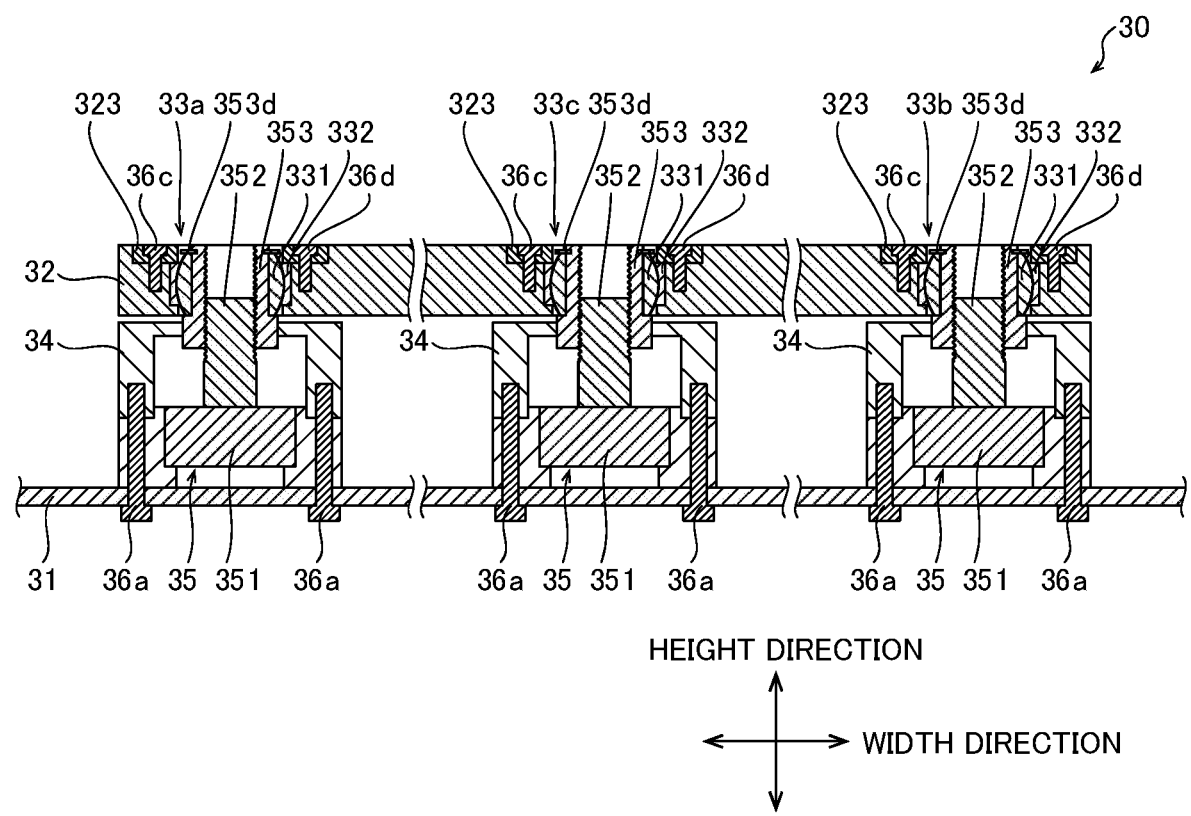
FIG. 3 is a cross-sectional view showing the height adjustment device according to the one embodiment taken along a plane along a height direction.

As shown in FIG. 3, the spherical plain bearing 33a includes an inner ring 331 and an outer ring 332. The inner ring 331 and the outer ring 332 of the spherical plain bearing 33a are fixed into the lower part 31 and the upper part 32, respectively. An intermediate member 34 and a lifter 35 are interposed between the inner ring 331 and the lower part 31. The lower part 31, the lifter 35 and the intermediate member 34 are secured to each other by bolts 36a and 36b, which pass through the lower part 31 and the lifter 35 and reach the intermediate member 34, for example.

The spherical plain bearings 33b and 33c have the same structure as the spherical plain bearing 33a, and include the inner ring 331 and the outer ring 332, which are fixed into the lower part 31 and the upper part 32, respectively, similar to the spherical plain bearing 33a. Accordingly, description of the spherical plain bearings 33b and 33c similar to the spherical plain bearing 33a is omitted for sake of simplify. The height adjustment device 30 includes three lifters 35 corresponding to the spherical plain bearings 33a, 33b and 33c. The lifter 35 corresponding to the spherical plain bearing 33a, the lifter 35 corresponding to the spherical plain bearing 33b, and the lifter 35 corresponding to the spherical plain bearing 33c are an example of a first lifter, an example of a second lifter, and an example of a third lifters, respectively.

Figure 4:
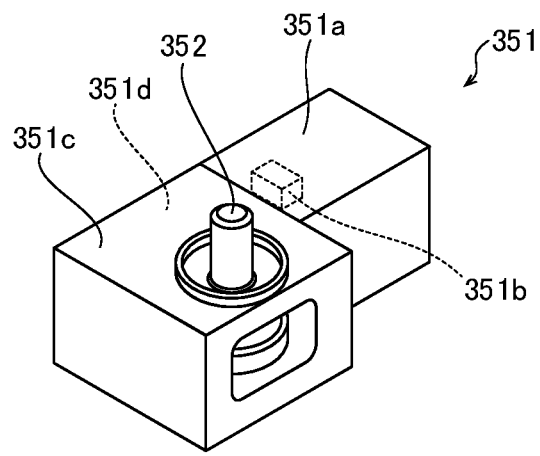
FIG. 4 is a perspective view showing a part of a lifter of the height adjustment device according to the one embodiment.

As shown in FIGS. 3 and 4, the lifter 35 includes a motor unit 351, an external-threaded member 352 configured to be rotationally driven by a motor 351a of the motor unit 351, and an internal-threaded member 353 as a moving member configured to move in the height direction in response to the rotation of the external-threaded member 352. The internal-threaded member 353 can be moved in the height direction when rotationally driven by the motor 351a.

Figure 5:
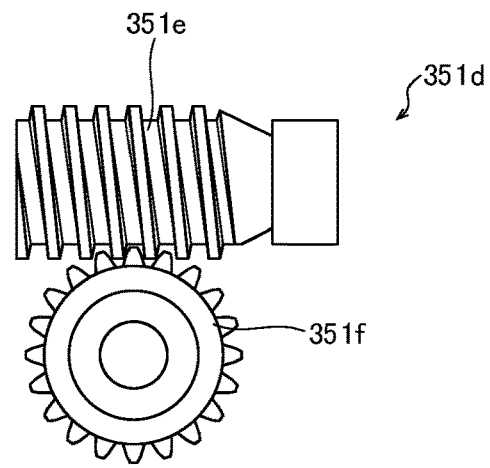
FIG. 5 is a schematic view showing a worm gear of the height adjustment device according to the one embodiment.

As shown in FIGS. 4 and 5, the motor unit 351 includes the motor 351a, an encoder 351b configured to detect a rotational position of the motor 351a, a housing 351c fixed to the motor 351a, and a worm gear 351d arranged in the housing 351c and configured to slow down the motor 351a and to transmit the slowed down rotation to the external-threaded member 352 and the internal-threaded member 353. The worm gear 351d serves as a speed reducer.

The worm gear 351d includes a rod-shaped worm 351e configured to be rotationally driven by the motor 351a, and a gear-shaped worm wheel 351f configured to engage with the worm 351e. Threads that are formed on an outer surface of the worm 351e are formed at a relatively small lead angle. Because the threads formed on the outer surface of the worm 351e are formed at a relatively small lead angle, even if an external force is applied to the worm 351e in an axial direction of the worm, a component of the external force that rotates the worm 351e is small. Accordingly, the height adjustment device 30 can have a self-locking mechanism, which does not require a motor brake.

The external-threaded member 352 is fixed at a center of the worm wheel 351f of the worm gear 351d, and extends in the height direction. The external-threaded member 352 rotates integrally with the worm wheel 351f. Threads that are formed on an outer surface of the external-threaded member 352 are formed at a relatively small lead angle. Because the threads formed on the outer surface of the external-threaded member 352 are also formed at a relatively small lead angle, this structure can provide the self-locking mechanism similar to the worm 351e. The internal-threaded member 353 threadedly engage with the external-threaded member 352 so that the internal-threaded member can move in the height direction in response to rotation of the external-threaded member 352.

Figure 6:
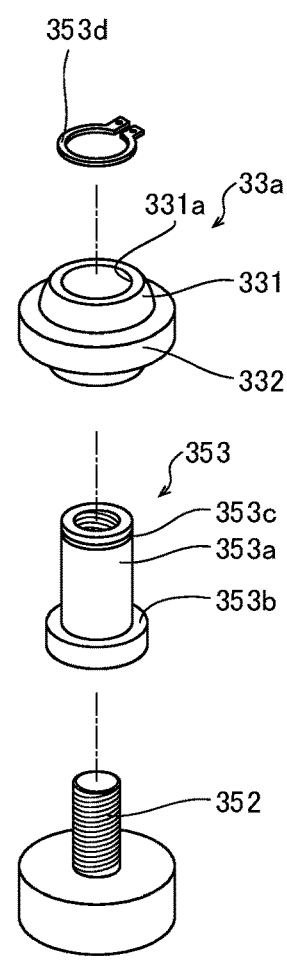
FIG. 6 is a perspective view showing a spherical plain bearing, a male thread part, and a female thread part of the height adjustment device according to the one embodiment.

As shown in FIG. 6, the internal-threaded member 353 has a cylindrical shaft 353a having threads formed on its inner wall, and a flange 353b arranged on a proximal end of the shaft 353a. A circular groove 353c is formed in a distal end of the shaft 353a.

The shaft 353a of the internal-threaded member 353 is inserted into an axial hole 331a of the inner ring 331 of the spherical plain bearing 33a. The groove 353c of the shaft 353a is arranged along an upper end of the inner ring 331 when a lower end of the inner ring 331 of the spherical plain bearing 33a contacts an upper surface of the flange 353b. In this arrangement, the spherical plain bearing 33a is secured to the internal-threaded member 353 by fitting an arc-shaped fastener 353d into the groove 353c. Also, the external-threaded member 352 is inserted into the internal-threaded member 353 from a flange 353b side of the axial hole of the internal-threaded member 353 while the external-threaded member 352 threadedly engages with the internal-threaded member.

The lifter 35 is mounted to the spherical plain bearing 33a as described above. Lifters 35 similar to this lifter are mounted to the spherical plain bearings 33b and 33c. Accordingly, description of the spherical plain bearings 33b and 33c similar to the spherical plain bearing 33a is omitted for sake of simplify.

As shown in FIG. 7, the spherical plain bearing 33a to which the lifter 35 is mounted is inserted into the through hole 321 formed in the upper part 32, and an outer rim of a lower surface of the outer ring 332 is mounted on a protrusion 322, which protrudes from a lower end of the inner wall of the through hole 321.

Also, the outer rim of the upper surface of the outer ring 332 contacts a central part of a lower surface of a lid member 323 (specifically, a peripheral part of the axial hole on the lower surface of the lid member 323). The lid member 323 is fitted into a recessed part 324 formed in the upper part 32. The recessed part 324 has a through hole 321 in its central part as viewed in the height direction.

The lid member 323 is fitted into the recessed part 324 of the upper part 32, and is then secured to the recessed part 324 by bolts 36c and 36d, for example. The spherical plain bearing 33a is positioned in the through hole 321 in the upper part 32 by securing the lid member 323 into the recessed part 324 in the upper part 32.

In this embodiment, the height adjustment device 30 adjusts the height and an inclination of the upper part 32 with respect to the lower part 31 by driving three lifters 35. The height adjustment device 30 is configured to adjust the height of the upper part 23 with respect to the lower part 31 and an inclination of the upper part 32 with respect to the lower part 31 by control by using the controller 20 configured to control the driving of the three lifters 35.

The height adjustment device 30 adjusts the inclination of the upper part 32 with respect to the lower part 31 by driving at least one of the three lifters 35 by control by using the controller 20.

The height adjustment device 30 adjusts the height of the upper part 32 with respect to the lower part 31 by driving all the three lifters 35 by control by using the controller 20. For example, the height adjustment device 30 adjusts the height of the upper part 32 with respect to the lower part 31 by driving all the three lifters 35 by the same distance. Also, the height adjustment device 30 adjusts the inclination in addition to the height of the upper part 32 with respect to the lower part 31 by driving the three lifters 35 by different driving distances.

(Adjustment of Inclination of Robot)

Exemplary adjustment of the inclination of the robot 10 using the height adjustment device 30 is now described with reference to FIG. 7. The following description describes a case in which the height adjustment device 30 adjusts an inclination of the upper part 32 with respect to the lower part 31 in which one side of the blade 131a corresponding to a left side of the upper part 32 is positioned lower relative to another side of the blade 131a corresponding to a right side of the upper part 32 in FIG. 3.

Figure 7A:
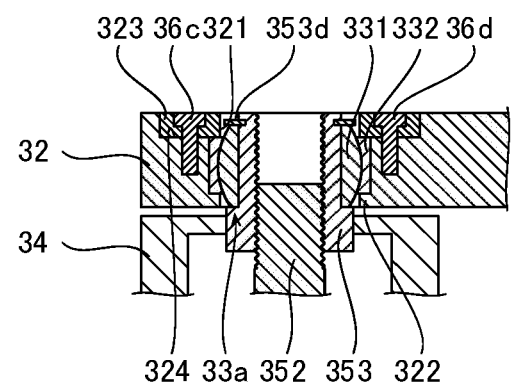
FIG. 7(A) is a cross-sectional view showing the spherical plain bearing and its peripheral part of the height adjustment device before an inclination of a robot is adjusted.

The motor 351a first rotationally drives the external-threaded member 352 through the worm gear 351d from a position shown in FIG. 7(A).

Figure 7B:
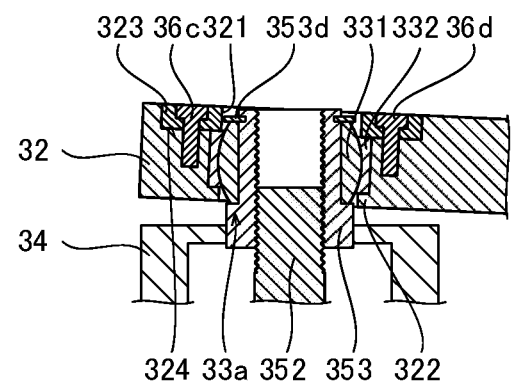
FIG. 7(B) is a cross-sectional view showing the spherical plain bearing and its peripheral part of the height adjustment device after an inclination of the robot is adjusted.

When the motor 351a rotationally drives the external-threaded member 352, the internal-threaded member 353, which threadedly engages with the external-threaded member 352, moves in the height direction although a height position of the external-threaded member 352 itself is unchanged. FIG. 7(B) is a cross-sectional view showing the spherical plain bearing and its peripheral part of the height adjustment device in which the internal-threaded member 353 is moved upward (in other words, the internal-threaded member 353 moves in the height direction) by rotating the external-threaded member 352 clockwise.

When the internal-threaded member 353 is moved upward, the inner ring 331 of the spherical plain bearing 33a, which is secured to the internal-threaded member 353 by the fastener 353d, is moved upward together with the internal-threaded member. At this time, because height positions of the spherical plain bearings 33b and 33c are unchanged, the outer ring 332 of the spherical plain bearing 33a slides on a contact surface of the inner ring 331 so that the outer ring 332 of the spherical plain bearing 33a is inclined with respect to a plane orthogonal to the height direction.

As discussed above, when the outer ring 332 of the spherical plain bearing 33a is inclined with respect to the plane orthogonal to the height direction, the upper part 32 fixed to the outer ring 332 also is inclined respect to the plane orthogonal to the height direction. At this time, the outer rings 332 of the spherical plain bearings 33b and 33c also slide on contact surfaces of the inner rings 331 so that the outer rings 332 of the spherical plain bearings 33b and 33c are inclined with respect to the plane orthogonal to the height direction.

The lower part 31 is mounted to the holding member 131b, while the upper part 32 is mounted to the blade 131a. As a result, the inclination of mounted blade 131a with respect to the holding member 131b can be adjusted by an inclination of the upper part 32 with respect to the plane orthogonal to the height direction as described above.

Here, when an inclination of the upper part 32 with respect to the lower part 31 is adjusted by two lifters 35 that are arranged at different points from each other as viewed in the height direction, a case in which the height adjustment device 30 does not have spherical plain bearings 33a, 33b and 33c is considered. In this case, if one of the two lifters 35 is driven to incline the upper part 32 with respect to the lower part 31, the upper part 32 will be distorted. In addition, the internal-threaded member 353 will be inclined together with the upper part 32 so that the external-threaded member 352 cannot rotate in the internal-threaded member 353.

Contrary to this, in the height adjustment device 30 according to this embodiment, as mentioned above, when the height of the spherical plain bearing 33a is adjusted by the lifter 35, the outer rings 332 of the spherical plain bearings 33b and 33c can be inclined with respect to the plane orthogonal to the height direction. Accordingly, the upper part 32 can be inclined with respect to the lower part 31 without distortion of the upper part 32 and without interference with rotation of the external-threaded member 352 in the internal-threaded member 353. As a result, the height adjustment device 30 according to this embodiment can reliably adjust with respect to the lower part 31, which is one part of the production apparatus main body 100a, an inclination of the upper part 32, which is one other part of the production apparatus main body 100a.

Although an inclination of the upper part 32 with respect to the lower part 31 has been illustratively described to be adjusted by adjusting a height position of the spherical plain bearing 33a by using the lifter 35, the inclination of the upper part 32 with respect to the lower part 31 may be adjusted by adjusting height positions of the spherical plain bearings 33b and 33c by using the lifters 35 if necessary.

Also, although an inclination of the blade 131a has been illustratively described to be adjusted by adjusting an inclination of the upper part 32 with respect to the lower part 31, an inclination of the blade 132a may be adjusted similar to the blade 131a.

(Adjustment of Height of Robot)

Exemplary adjustment of a height of the robot 10 using the height adjustment device 30 is now described with reference to FIG. 8. The following description describes adjustment in which the height adjustment device 30 increases a height of the upper part 32 with respect to the lower part 31 by simultaneously driving all the three lifters 35 by the same distance.

Figure 8A:
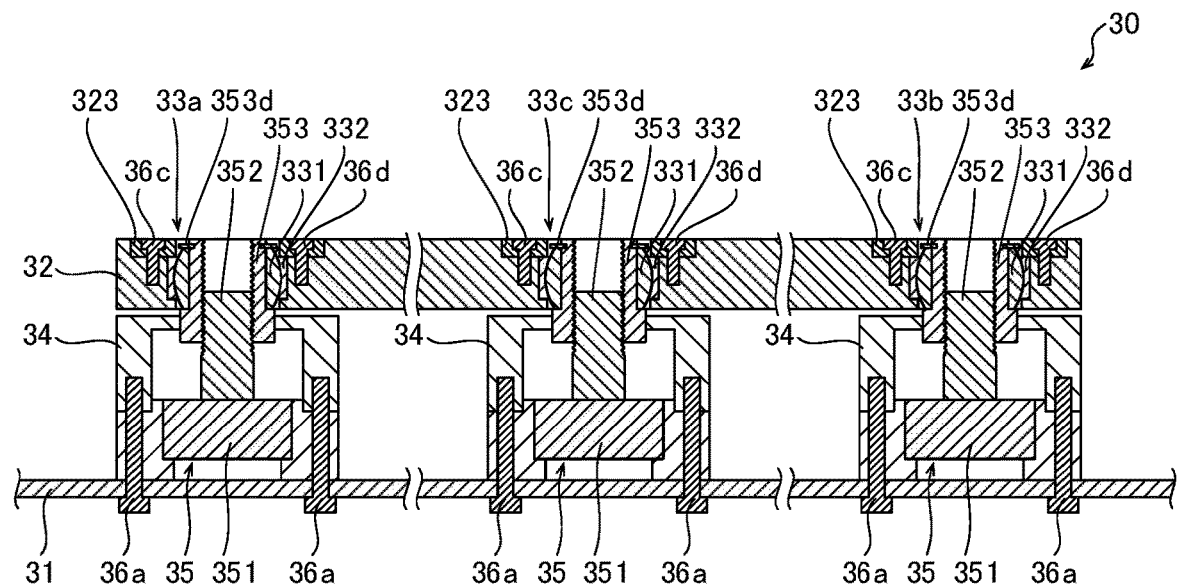
FIG. 8(A) is a cross-sectional view showing the spherical plain bearings and their peripheral parts of the height adjustment device before a height of a robot is adjusted.
Figure 8B:
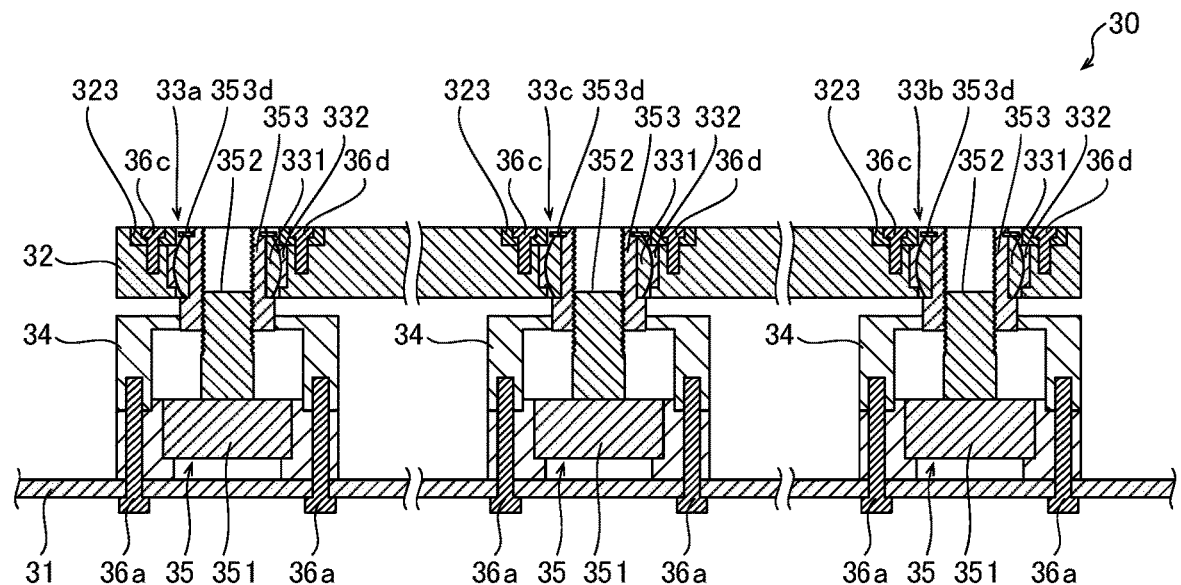
FIG. 8(B) is a cross-sectional view showing the spherical plain bearings and their peripheral parts of the height adjustment device after the height of the robot is adjusted.

The motors 351a of the three lifters 35 first rotationally drive the external-threaded members 352 through the worm gears 351d from a position shown in FIG. 8(A). When the motors 351a of the three lifters 35 rotationally drive the external-threaded member 352, the internal-threaded members 353 of the three lifters 35, which threadedly engage with the external-threaded members 352, move in the height direction. In FIG. 8(B), the internal-threaded members 353 of the three lifters 35 are moved upward by the same distance by rotating the external-threaded members 352 of the three lifters 35 clockwise.

When the internal-threaded member 353 of the three lifters 35 are moved upward, the three spherical plain bearings 33a, 33b and 33c, which are secured to the internal-threaded members 353 by the fasteners 353d, are moved upward together with the internal-threaded members. Also, the upper part 32, which includes the three spherical plain bearings 33a, 33b and 33c, is moved upward while keeping an inclination of the upper part. Accordingly, the height of the upper part 32 is adjusted with respect to the lower part 31. Because the lower part 31 is mounted to the holding member 131b, while the upper part 32 is mounted to the blade 131a, the height of the blade 131a with respect to the holding member 131b is adjusted by moving the upper part 32 in the height direction.

Although the height of the upper part 32 has been illustratively described to be adjusted with respect to the lower part 31 while the upper part 32 is parallel to the plane perpendicular to the height direction in FIG. 8, the height of the upper part 32 may be adjusted with respect to the lower part 31 while the upper part 32 is kept at an adjusted inclination of the upper part 32 is adjusted with respect to the lower part 31 as shown in FIG. 7. In this case, the height of the upper part 32 is adjusted with respect to the lower part 31 while the upper part 32 is inclined and the inclination of the upper part 32 is adjusted with respect to the plane perpendicular to the height direction. Also, in this case, the height of the upper part 32 with respect to the lower part 31 can be adjusted without distortion of the upper part 32 and without interference with rotation of the external-threaded member 352 in the internal-threaded member 353.

Also, although a height of the blade 131a has been illustratively described to be adjusted by adjusting an inclination of the upper part 32 with respect to the lower part 31, the height of the blade 132a may be adjusted similar to the blade 131a.

(Adjustment of Pitch Between Blades)

Figure 9:
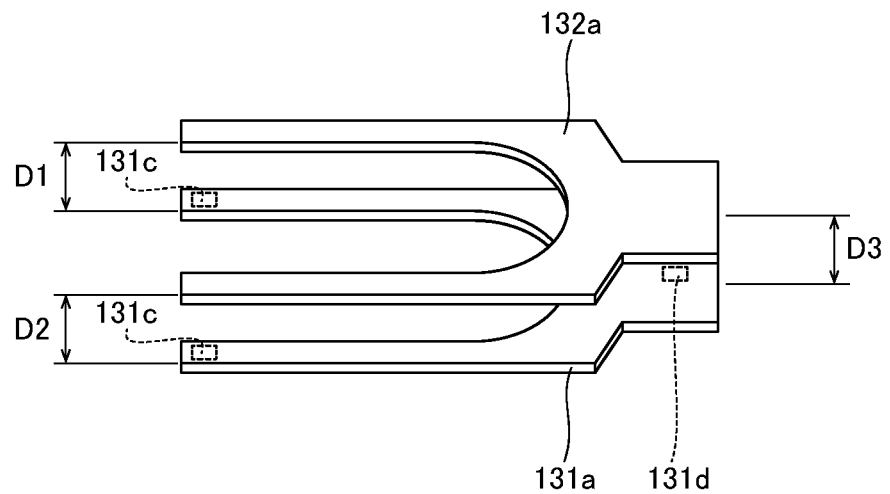
FIG. 9 is a perspective view showing blades and sensors according to the one embodiment.
Figure 10:
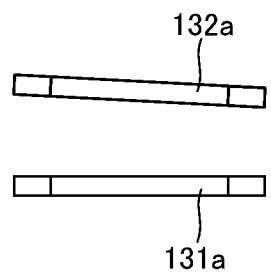
Figure 10:
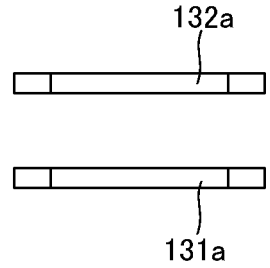

In this embodiment, as shown in FIGS. 9 to 11, the height adjustment device 30 is configured to adjust a pitch P between the blade 131a and the blade 132a by adjusting a height of at least one of the blade 131a and the blade 132a. Specifically, the height adjustment device 30 (production apparatus 100) further includes the sensors 131c and 131d configured to detect distances between the blade 131a and the blade 132a. The height adjustment device 30 is configured to adjust a pitch P between the blade 131a and the blade 132a by adjusting a height of at least one of the blade 131a and the blade 132a based on the distances between the blade 131a and the blade 132a detected by the sensors 131c and 131d. The sensors 131c and the sensor 131d are an example of a first sensor and an example of a second sensor, respectively.

In this embodiment, the sensors 131c are arranged on a distal part of the blade 131a. Also, the sensor 131d is arranged on a proximal part of the blade 131a. The height adjustment device 30 is configured to adjust the pitch P between the blade 131a and the blade 132a and an inclination of the blade 132a with respect to the blade 131a based on the distances between the blade 131a and the blade 132a detected by the sensors 131c and 131d. The sensors 131c and 131d are an optical sensor such as a laser displacement gage that can detect a distance.

The sensors 131c are arranged in first and second distal ends of the bifurcated blade 131a as shown in FIG. 9. In other words, two sensors 131c are provided. The sensor 131c of the first distal end of the blade 131a is configured to detect a distance D1 between the first distal end of the blade 131a and the first distal end of the blade 132a in the height direction, and to provide the detected distance D1 to the controller 20. The sensor 131c of the second distal end of the blade 131a is configured to detect a distance D2 between the second distal end of the blade 131a and the second distal end of the blade 132a in the height direction, and to provide the detected distance D2 to the controller 20.

One sensor 131d is arranged in a center of the proximal end of the blade 131a. The sensor 131d is configured to detect a height distance D3 between the proximal end of the blade 131a and the proximal end of the blade 132a, and to provide the detected distance D3 to the controller 20.

As shown in FIG. 10, the controller 20 is configured to control operation of at least one of the two height adjustment devices 30 based on the distances D1, D2 and D3 detected by the sensors 131c and 131d whereby adjusting the inclination of the blade 132a with respect to the blade 131a. Specifically, the controller 20 can control the operation of at least one of the two height adjustment devices 30 based on the distances D1, D2 and D3 whereby aligning the blade 131a and the blade 132a substantially parallel to each other. That is, the controller 20 controls the operation of at least one of the two height adjustment devices 30 whereby substantially equalizing the distances D1, D2 and D3 to each other.

For example, from a position shown in FIG. 10(A), the controller 20 adjusts an inclination of the blade 132a by using the height adjustment device 30 provided for the blade 132a. After that, the blade 131a and the blade 132a become substantially parallel to each other as shown in FIG. 10(B). The inclination of the blade 131a may be adjusted by the height adjustment device 30 provided for the blade 131a, or inclinations of both the blades 131a and 132a may be adjusted by the two height adjustment devices 30.

As shown in FIG. 11, the controller 20 is configured to control operation of at least one of the two height adjustment devices 30 based on the distances D1, D2 and D3 detected by the sensors 131c and 131d whereby adjusting the pitch P between the blade 131a and the blade 132a. That is, the controller 20 controls the operation of at least one of the two height adjustment devices 30 whereby substantially adjusting the distances D1, D2 and D3 to a target pitch P.

Figure 11A:
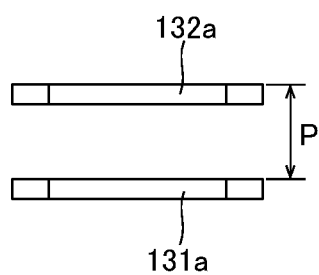
FIG. 11(A) is a cross-sectional view showing the blades before a pitch between the blades are adjusted.
Figure 11B:
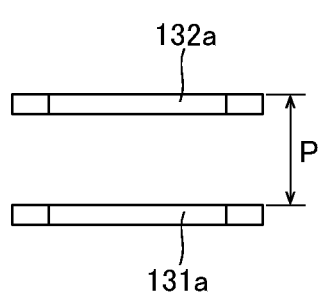
FIG. 11(B) is a cross-sectional view showing the blades after the pitch between the blades is adjusted.

For example, from a position shown in FIG. 11(A), the controller 20 adjusts a height of the blade 132a by using the height adjustment device 30 provided for the blade 132a. After that, the pitch P between the blade 131a and the blade 132a is adjusted to the target pitch P as shown in FIG. 11(B). The height of the blade 131a may be adjusted by the height adjustment device 30 provided for the blade 131a, or heights of both the blades 131a and 132a may be adjusted by the two height adjustment devices 30.

Advantages of the Embodiment

In this embodiment, the following advantages are obtained.

In this embodiment, as discussed above, the height adjustment device 30 including the spherical plain bearing 33a, the spherical plain bearing 33b and the spherical plain bearing 33c, and the three lifters 35 that are arranged corresponding to the spherical plain bearing 33a, the spherical plain bearing 33b and the spherical plain bearing 33c are provided so that a height of the upper part 32 is adjusted with respect to the lower part 31 by driving the three lifters 35. Accordingly, the height of the upper part 32 with respect to the lower part 31 can be adjusted by using the spherical plain bearing 33a, the spherical plain bearing 33b and the spherical plain bearing 33c without distortion of the lower part 31 and the upper part 32 relative to each other. As a result, it is possible to easily adjust, with respect to the lower part 31, which is a part of the production apparatus main body 100a, the height of the upper part 32, which is one other part of the production apparatus main body 100a. Also, an inclination of the upper part 32 with respect to the lower part 31 can be adjusted by using the spherical plain bearing 33a, the spherical plain bearing 33b and the spherical plain bearing 33c without distortion of the lower part 31 and the upper part 32 relative to each other. Consequently, it is possible to easily adjust the inclination of the upper part 32 with respect to the lower part 31.

In this embodiment, as discussed above, the production apparatus main body 100a has the blade 131a, and the blade 132a that is arranged adjacent to the blade 131a in the height direction. Also, each of the blade 131a and the blade 132a is provided with the height adjustment device 30. Accordingly, the height and an inclination of the upper part 32 can be adjusted with respect to the lower part 31 in each of the blade 131a and the blade 132a. As a result, it is possible to increase flexibility of height and inclination adjustment as compared to a case in which the height adjustment device 30 is provided for only one of the blade 131a and the blade 132a.

In this embodiment, as discussed above, the height adjustment device 30 is configured to adjust a pitch P between the blade 131a and the blade 132a by adjusting a height of at least one of the blade 131a and the blade 132a. Accordingly, the pitch P between the blade 131a and the blade 132a can be adjusted by effectively using the height adjustment device 30. As a result, the pitch P between the blade 131a and the blade 132a can be adjusted without increasing the number of components.

In this embodiment, as discussed above, the height adjustment device 30 (production apparatus 100) further includes the sensors 131c and 131d configured to detect distances between the blade 131a and the blade 132a. The height adjustment device 30 is configured to adjust a pitch P between the blade 131a and the blade 132a by adjusting a height of at least one of the blade 131a and the blade 132a based on the distances between the blade 131a and the blade 132a detected by the sensors 131c and 131d. Accordingly, it is possible accurately adjust the pitch P between the blade 131a and the blade 132a based on the distances between the blade 131a and the blade 132a detected by the sensors 131c and 131d.

In this embodiment, as discussed above, the production production apparatus main body 100a includes the robot 10 configured to hold and convey a semiconductor substrate S. In addition, the robot 10 includes the blade 131a and the blade 132a to hold the semiconductor substrate S. Accordingly, the height and an inclination of the upper part 32 can be adjusted with respect to the lower part 31 in each of the blade 131a and the blade 132a. As a result, it is possible to increase flexibility of height and inclination adjustment in the robot 10 for semiconductor production processes including the blade 131a and the blade 132a.

In this embodiment, as discussed above, the production apparatus 100 includes the controller 20 configured to control driving of the three lifter 35. The height adjustment device 30 is configured to adjust the height of the upper part 32 with respect to the lower part 31 and an inclination of the upper part 32 with respect to the lower part 31 by control by using the controller 20 configured to control the driving of the three lifters 35. Accordingly, it is possible to automatically adjust the height of the upper part 32 with respect to the lower part 31 and an inclination of the upper part 32 with respect to the lower part 31 by using the height adjustment device 30 under control by the controller 20. As a result, it is possible to prevent a burden on an operator as compared to a case in which the operator manually adjusts an inclination of the upper part 32 with respect to the lower part 31 and the height of the upper part 32 with respect to the lower part 31 by using the height adjustment device 30.

In this embodiment, as discussed above, the sensors 131c and 131d include the sensors 131c mounted on the distal part of the blade 131a, and the sensors 131d mounted on the proximal part of the blade 131a. In addition, the height adjustment device 30 is configured to adjust the pitch P between the blade 131a and the blade 132a and an inclination of the blade 132a with respect to the blade 131a based on the distances between the blade 131a and the blade 132a detected by the sensors 131c and 131d. Accordingly, it is possible to adjust both the pitch P between the blade 131a and the blade 132a and an inclination of the blade 132a with respect to the blade 131a based on the distances between the blade 131a and the blade 132a detected by the sensors 131c and 131d. As a result, it is possible to adjust the pitch P between the blade 131a and the blade 132a while aligning the blade 131a and the blade 132a parallel to each other whereby equalizing inclinations of the blade 131a and the blade 132a with each other.

Modified Embodiment

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which a production apparatus for producing semiconductors includes the height adjustment device has been shown in the aforementioned embodiment, the present disclosure is not limited to this. For example, the height adjustment device may be included in a production apparatus (such as an industrial robot) other than the production apparatus for producing semiconductors. Also, the height adjustment device may be included in an apparatus other than the production apparatus. For example, the height adjustment device may be included in an automatic guided vehicles (AGV), an operating table, a medical bed, etc.

In a case in which the height adjustment device is included in an automated guided vehicle, a body of the automated guided vehicle can be inclined or lifted depending on movement conditions of the automated guided vehicle.

In a case in which the height adjustment device is included in an operating table or a medical bed, the height adjustment device can lower the operating table or the medical bed or lift the operating table or the medical bed back to its original height when a person is placed onto or moved from the operating table or the medical bed. Also, the height adjustment device can incline the operating table or the medical bed.

Figure 12:
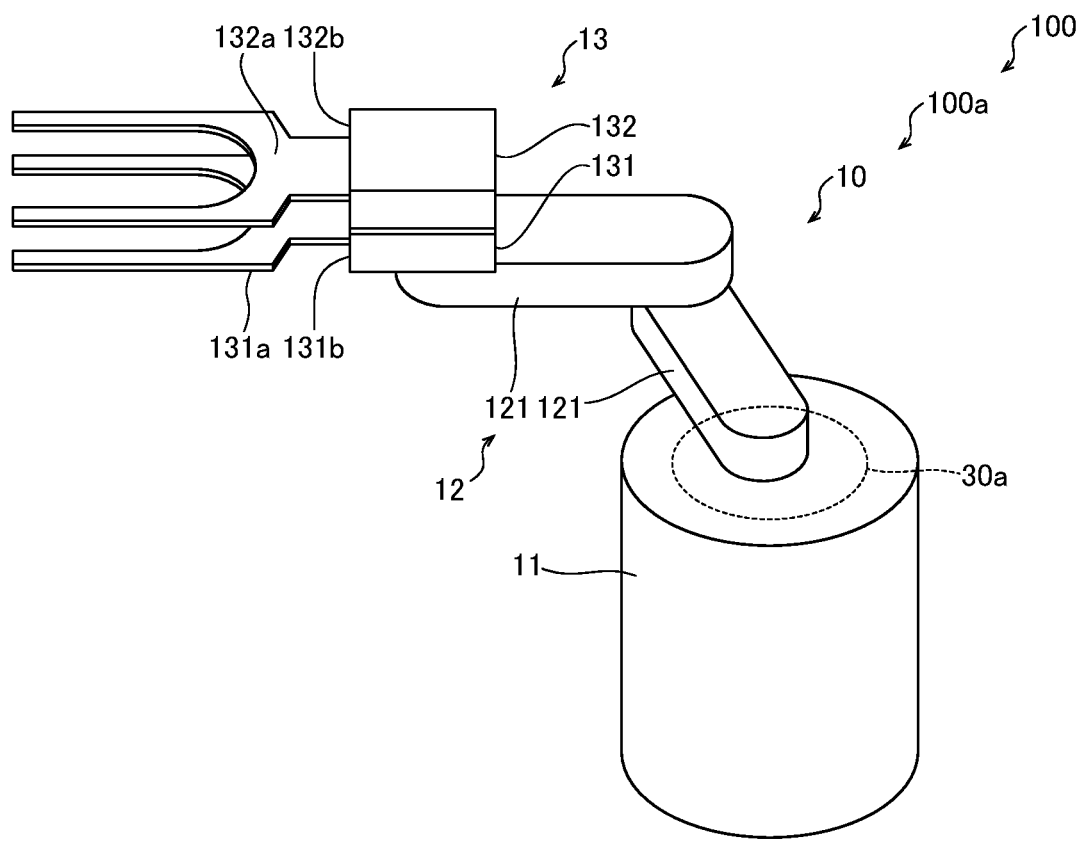
FIG. 12 is a perspective view entirely showing a configuration of a production apparatus according to a first modified embodiment.

While the example in which the height adjustment device is arranged between the arm part and the hand part has been shown in the aforementioned embodiment, the present disclosure is not limited to this. For example, a height adjustment device 30a may be arranged between the base 11 and the proximal end of the arm part 12, as shown in the first modified embodiment of FIG. 12. In this case, a height and an inclination of the arm part 12 with respect to the base 11 can be easily adjusted. The height adjustment device 30a has a structure similar to the structure of the height adjustment device 30 in the foregoing embodiment.

Figure 13:
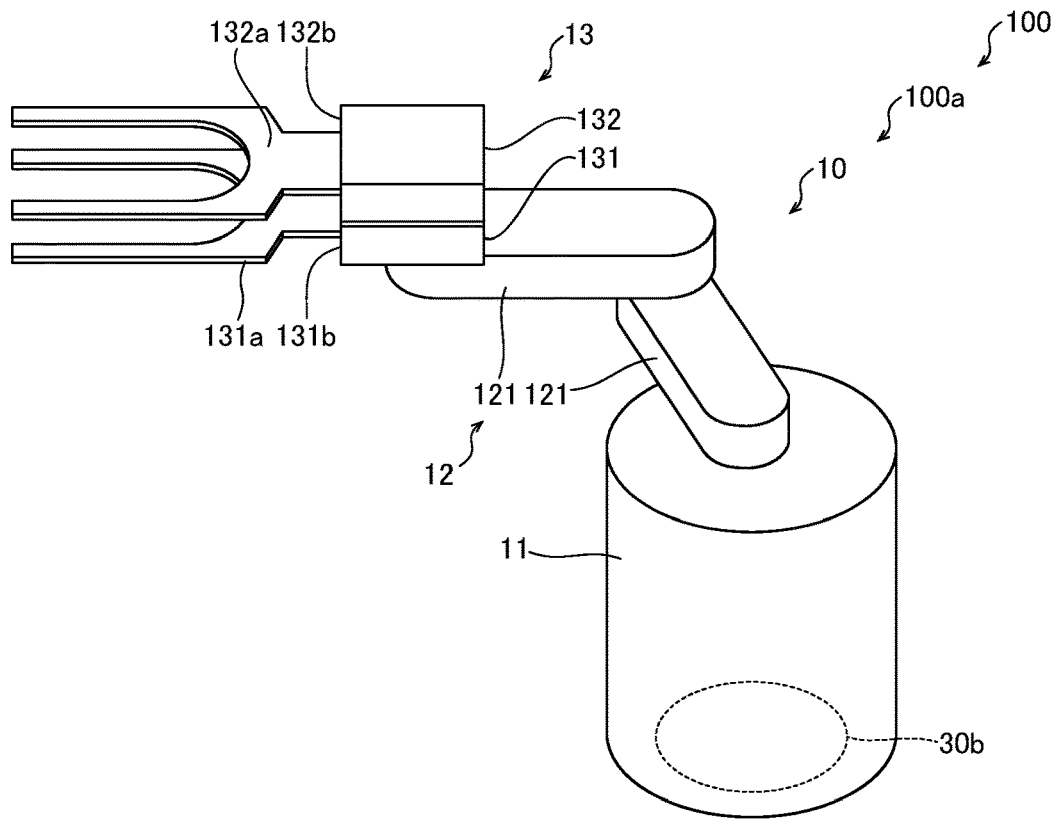
FIG. 13 is a perspective view entirely showing a configuration of a production apparatus according to a second modified embodiment.

Also, a height adjustment device 30b may be arranged between a floor surface and the base 11, for example, as shown in the second modified embodiment of FIG. 13. In this case, a height and an inclination of the base 11 with respect to the floor surface can be easily adjusted. The height adjustment device 30b has a structure similar to the structure of the height adjustment device 30 in the foregoing embodiment. In the first and second modified embodiments, if an amount of adjustable height by the height adjustment device 30a or 30b is enough, another height movement mechanism is not needed in addition to the height adjustment device 30a or 30b.

Figure 14:
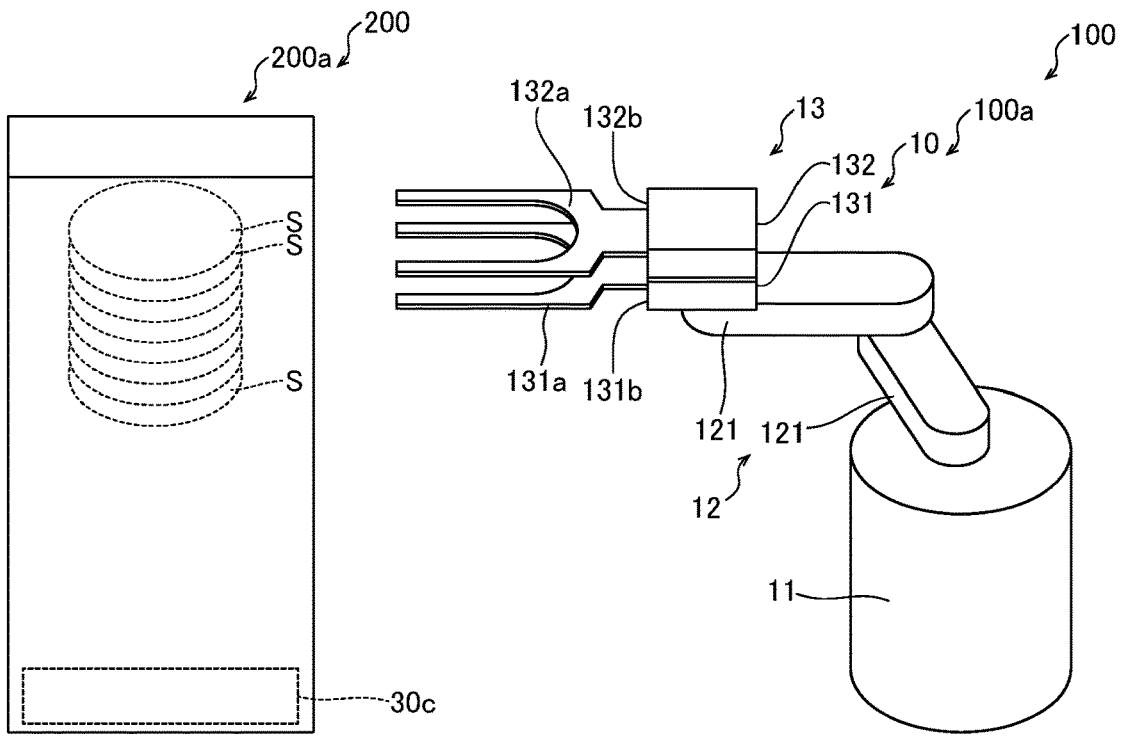
FIG. 14 is a perspective view entirely showing a configuration of a production apparatus according to a third modified embodiment.

While the example in which the height adjustment device is included in the robot configured to hold and convey a semiconductor substrate has been shown in the aforementioned embodiment, the present disclosure is not limited to this. For example, as shown in a third modified embodiment shown of FIG. 14, a container 200 is arranged as a production apparatus in proximity to the robot 10 to accommodate a number of semiconductor substrates S that are stacked in the height direction. The container 200 is, for example, a Front Opening Unified Pod (FOUP) that can air-tightly hold the number of semiconductor substrates S. The container 200 includes a container main body 200a. In the third modified embodiment, a height adjustment device 30c is arranged between the floor surface and the container main body 200a. In this case, a height and an inclination of the container 200 with respect to the floor surface can be easily adjusted. The height adjustment device 30c has a structure similar to the structure of the height adjustment device 30 in the foregoing embodiment. The container 200 is an example of the production apparatus. The container main body 200a is an example of a production apparatus main body and an example of a predetermined apparatus main body.

While the example in which the hand part of the robot includes two hands of the upper hand and the lower hand has been shown in the aforementioned embodiment, the present disclosure is not limited to this. For example, the hand part of the robot may include only one hand.

While the example in which the hand part of the robot includes two blades has been shown in the aforementioned embodiment, the present disclosure is not limited to this. For example, the hand part of the robot may have one blade, or three of more blades.

While the example in which the height adjustment device includes three spherical plain bearings and three lifters has been shown in the aforementioned embodiment, the present disclosure is not limited to this. For example, the height adjustment device may include four or more spherical plain bearings and four or more lifters.

While the example in which the inner ring and the outer ring of the spherical plain bearing are fixed into the lower part and the upper part, respectively, and the lifter is interposed between inner ring and the lower part has been shown in the aforementioned embodiment, the present disclosure is not limited to this. For example, the inner ring and the outer ring of the spherical plain bearing may be fixed into the upper part and the lower part, respectively. In other words, one of the inner ring and the outer ring of the spherical plain bearing can be fixed into the lower part, and another of the inner ring and the outer ring of the spherical plain bearing can be fixed into the upper part. For example, the lifter may be interposed between the outer ring of the spherical plain bearings and the upper part. The lifter can be interposed at least one of a part between one of the inner ring and the outer ring and the lower part, and a part between another of the inner ring and the outer ring and the upper part.

Figure 15:
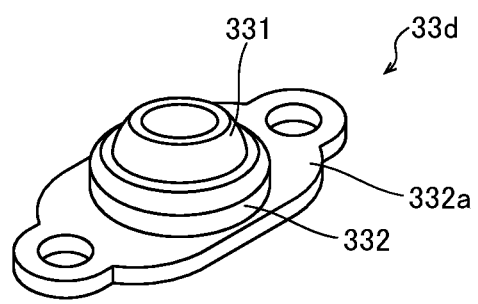
FIG. 15 is a perspective view showing a configuration of a spherical plain bearing according to a fourth modified embodiment.

While the example in which the spherical plain bearing is mounted to the upper part by using the lid member has been shown in the aforementioned embodiment, the present disclosure is not limited to this. For example, as shown in a fourth modified embodiment of FIG. 15, a spherical plain bearing 33d may have a flange part 332a as a fixed part formed on sides of the outer ring 332. In this case, the spherical plain bearing 33d is mounted to the upper part 32 by securing the flange part 332a by bolts.

While the example in which the three spherical plain bearings are arranged at the same height has been shown in the aforementioned embodiment, the present disclosure is not limited to this. For example, three spherical plain bearings may be arranged at different heights from each other. Also, two of the three spherical plain bearings may be arranged at the same height, while the one other may be arranged at a different height.

While the example in which the lifter includes an electric motor configured to rotationally drive the external thread member has been shown in the aforementioned embodiment, the present disclosure is not limited to this. For example, the lifter may include an operation unit through which a user can manually operate rotation of the external-threaded member.

While the example in which a worm gear (speed reducer) is arranged between the electric motor and the external thread member has been shown in the aforementioned embodiment, the present disclosure is not limited to this. For example, a speed reducer other than the worm gear may be arranged between the motor and the external-threaded member. Alternatively, the motor and the external-threaded member may be directly connected to each other, While the example in which the first mechanism and the second mechanism are a blade installed in the robot and configured to hold and convey a semiconductor substrate has been shown in the aforementioned embodiment, the present disclosure is not limited to this. For example, the first mechanism and the second mechanism may be a wafer holder installed in a container configured to hold and accommodate wafers.

While the example in which the sensors are arranged on one of two blades has been shown in the aforementioned embodiment, the present disclosure is not limited to this. For example, the sensors may be arranged on both the two blades. In a case in which the sensors are arranged on one of two blades, the sensors may be arranged on any one of the two blades.

While the example in which the sensors are arranged on in the distal end and the proximal part of the blade has been shown in the aforementioned embodiment, the present disclosure is not limited to this. For example, the sensor may be arranged only on the distal part or the proximal part of the blade.

DESCRIPTION OF REFERENCE NUMERALS

10; robot
20; controller
30; height adjustment device (height adjustment unit)
31; lower part
32; upper part
33a; spherical plain bearing (first spherical plain bearing)
33b; spherical plain bearing (second spherical plain bearing)
33c; spherical plain bearing (third spherical plain bearing)
35; lifter (first lifter, second lifter, third lifter)
100a; production apparatus main body (predetermined apparatus main body)
100; production apparatus
131a; blade (first mechanism, first blade)
131b; blade (second mechanism, second blade)
131c; sensor (first sensor)
131d; sensor (second sensor)
200; container (production apparatus)
200a; container main body (predetermined apparatus main body, production apparatus main body)
P; pitch
S; semiconductor substrate

The invention claimed is:

1. A production apparatus comprising:
a production apparatus main body comprising a robot that is configured to hold and convey a semiconductor substrate, the robot including a first blade and a second blade that are configured to hold the semiconductor substrate;
a first sensor and a second sensor respectively arranged in a distal part and a proximal part of at least one of the first blade and the second blade; and
height adjustment devices installed in the production apparatus main body and provided for each of the first blade and the second blade, wherein
each height adjustment device includes:
a lower part that is a part of the production apparatus main body;
an upper part that is one other part of the production apparatus main body and faces the lower part in a height direction;
a first spherical plain bearing, a second spherical plain bearing, and a third spherical plain bearing that are interposed between the lower part and the upper part and are arranged at different points from each other as viewed in the height direction; and
a first lifter for the first spherical plain bearing, a second lifter for the second spherical plain bearing, and a third lifter for the third spherical plain bearing, the first, second, and third lifters being configured to adjust a height of the upper part with respect to the lower part, and the height adjustment device being configured to adjust the height of the upper part with respect to the lower part by driving the first lifter, the second lifter, and the third lifter, and
the height adjustment devices are configured (i) to adjust a pitch between the first blade and the second blade by adjusting the height of at least one of the first blade and the second blade and (ii) to adjust an inclination of the second blade with respect to the first blade based on a distance between the first blade and the second blade detected by the first sensor and a distance between the first blade and the second blade detected by the second sensor.

2. The production apparatus according to claim 1, further comprising a controller that is configured to control driving of the first lifter, the second lifter, and the third lifter, wherein
each height adjustment device is configured to adjust the height of the upper part with respect to the lower part and an inclination of the upper part with respect to the lower part by control by using the controller.

3. A robot configured to hold and convey a semiconductor substrate, the robot comprising:
a first blade and a second blade that are configured to hold the semiconductor substrate;
a first sensor and a second sensor respectively arranged in a distal part and a proximal part of at least one of the first blade and the second blade; and
height adjustment devices provided for each of the first blade and the second blade, wherein
each height adjustment device includes:
a lower part;
an upper part that faces the lower part in a height direction;
a first spherical plain bearing, a second spherical plain bearing, and a third spherical plain bearing that are interposed between the lower part and the upper part and are arranged at different points from each other as viewed in the height direction; and
a first lifter for the first spherical plain bearing, a second lifter for the second spherical plain bearing, and a third lifter for the third spherical plain bearing, the first, second, and third lifters being configured to adjust a height of the upper part with respect to the lower part, and the height adjustment device being configured to adjust the height of the upper part with respect to the lower part by driving the first lifter, the second lifter, and the third lifter, and
the height adjustment devices are configured (i) to adjust a pitch between the first blade and the second blade by adjusting the height of at least one of the first blade and the second blade and (ii) to adjust an inclination of the second blade with respect to the first blade based on a distance between the first blade and the second blade detected by the first sensor and a distance between the first blade and the second blade detected by the second sensor.

4. A method of using a robot,
the robot comprising:
a first blade and a second blade that are configured to hold the semiconductor substrate;
a first sensor and a second sensor respectively arranged in a distal part and a proximal part of at least one of the first blade and the second blade; and
height adjustment devices provided for each of the first blade and the second blade, wherein
each height adjustment device includes:
a lower part;
an upper part that faces the lower part in a height direction;
a first spherical plain bearing, a second spherical plain bearing, and a third spherical plain bearing that are interposed between the lower part and the upper part and are arranged at different points from each other as viewed in the height direction; and a first lifter for the first spherical plain bearing, a second lifter for the second spherical plain bearing, and a third lifter for the third spherical plain bearing, the first, second, and third lifters being configured to adjust a height of the upper part with respect to the lower part, and the height adjustment device being configured to adjust the height of the upper part with respect to the lower part by driving the first lifter, the second lifter, and the third lifter, and the method comprising:

with the height adjustment devices, (i) adjusting a pitch between the first blade and the second blade by adjusting the height of at least one of the first blade and the second blade and (ii) adjusting an inclination of the second blade with respect to the first blade based on a distance between the first blade and the second blade detected by the first sensor and a distance between the first blade and the second blade detected by the second sensor.

\* \* \* \* \*